INVENTOR.
JULIUS EDGAR LILIENFELD
BY
ATTORNEYS.

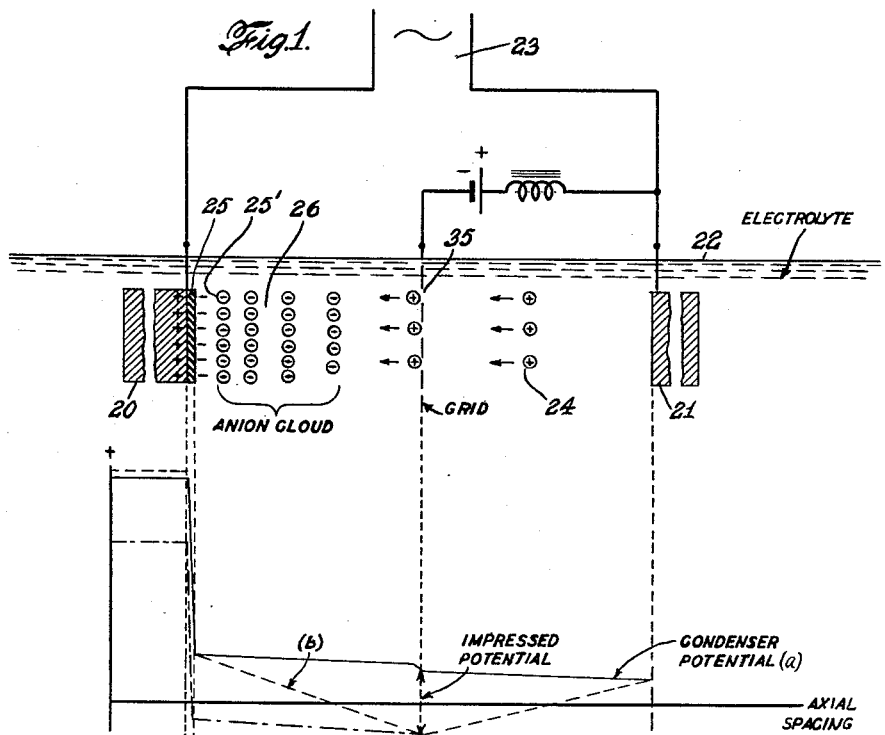
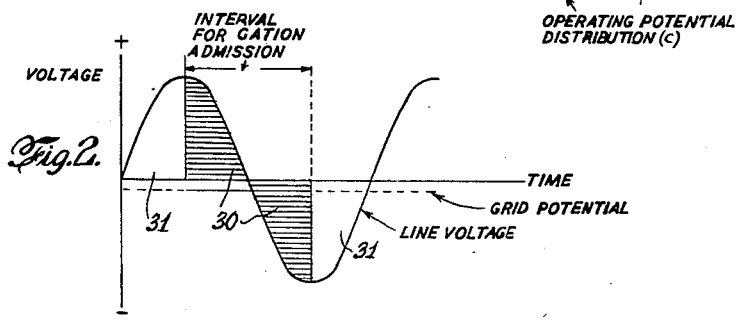
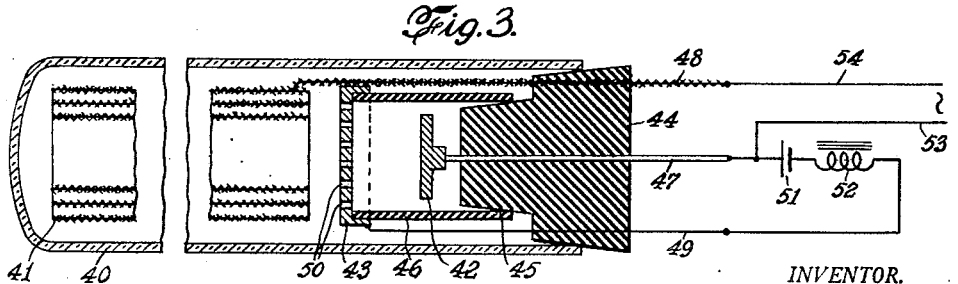

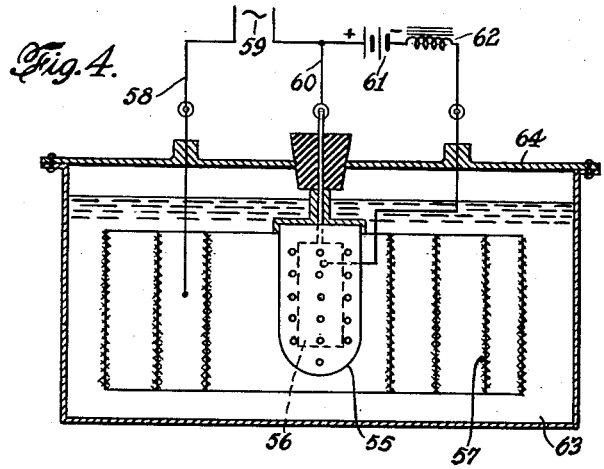
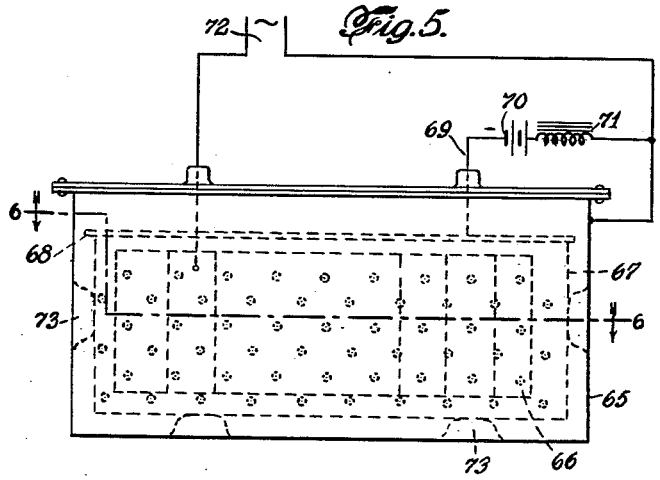
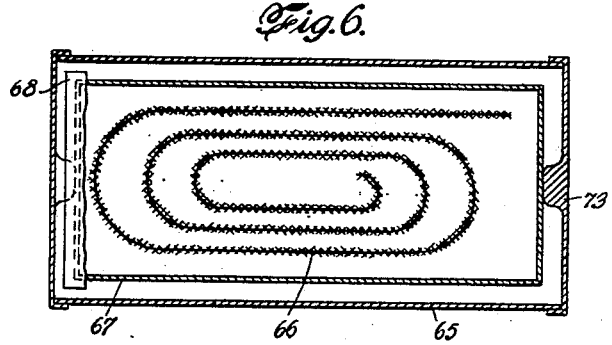

Feb. 19, 1952 J. E. LILIENFELD 2,585,947
ELECTROLYTIC CONDENSER FOR ALTERNATING CURRENT POWER
CIRCUITS AND METHOD OF OPERATING THE SAME
Filed Feb. 3, 1949 5 Sheets-Sheet 4

INVENTOR.
JULIUS EDGAR LILIENFELD
BY
Emery Holcombe & Blair
ATTORNEYS

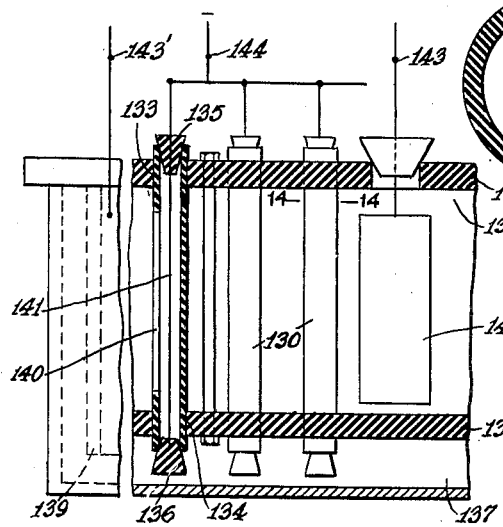
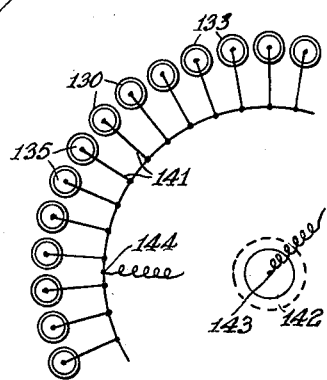
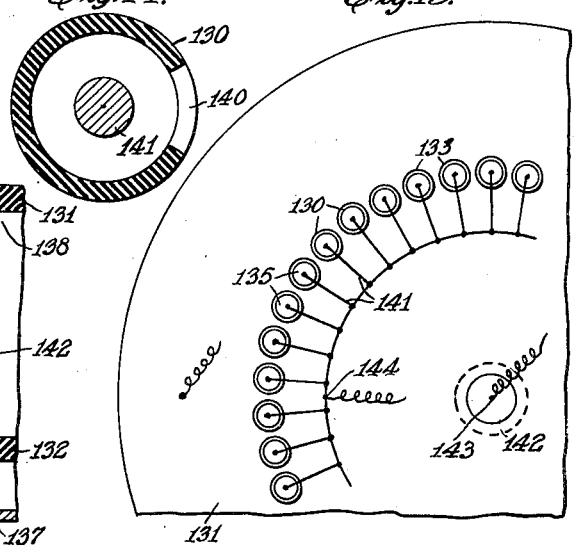
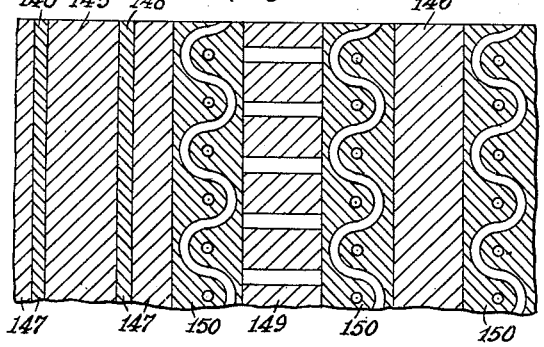
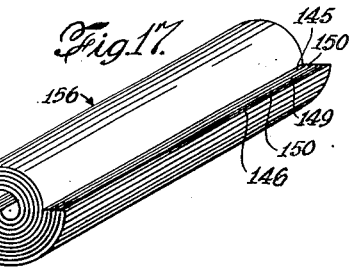
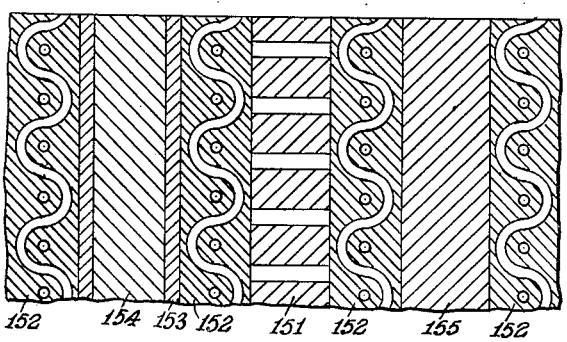
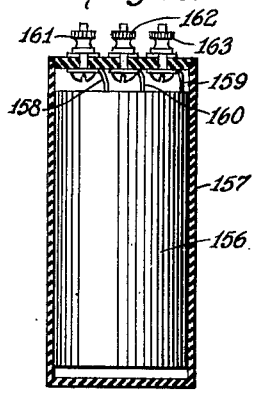
INVENTOR.
JULIUS EDGAR LILIENFELD
BY
ATTORNEYS Patented Feb. 19, 1952

2,585,947

UNITED STATES PATENT OFFICE 2,585,947

ELECTROLYTIC CONDENSER FOR ALTERNATING CURRENT POWER CIRCUITS AND METHOD OF OPERATING THE SAME

Julius Edgar Lilienfeld, St. Thomas, V. I.

Application February 3, 1949, Serial No. 74,274

25 Claims. (Cl. 175—315)

1

The invention relates to electric condensers of the electrolytic type in which an electrode is provided with a dielectric film of a thickness of a smaller order of magnitude than the spacing between the condenser electrodes; and it is concerned more especially with a novel construction of this type of condenser and a method of operation of the same on alternating voltage. Electrolytic condensers, as heretofore constructed, have proved unsuitable for prolonged use on alternating voltage due to a progressive deterioration of the dielectric film. An attempt to overcome this difficulty involved the use of twin filmed electrodes connected in series which, however, was equivalent to sacrificing deliberately 75% of the effective capacity, and was otherwise unsuccessful. It was also proposed, as set forth in the United States patent to Moscicki #926,128, to impress upon the electrolyte of a condenser having such twin electrodes a negatively biased unidirectional voltage to check and to heal immediately any such deterioration. The latter purpose, however, was only partly attained inasmuch as the provision of said bias, while serving to heal breakdowns occurring at one or a few points, did not counteract the steady deterioration over the full area of the film, which occurs with an extended alternating current operation. For the latter reason the bias proposed by Moscicki failed to secure the desired result; and there is at the present time no electrolytic condenser manufactured for sustained use on an alternating current circuit.

Failure to comprehend the physicochemical nature of the deterioration of the dielectric film on an electrode explains the lack of success of the prior attempts. It is the inherent property of such dielectric films, when negatively charged, to break down and allow the current to pass into the positively charged electrolyte of the condenser. To overcome such breakdown, it was, as hereinbefore stated, proposed to operate two identical filmed electrodes in series. Such "twin electrode" arrangement then acts as a current limiting device inasmuch as the negative phase of an applied voltage cannot break down one electrode unless the other electrode, at which the phase is then positive, breaks down simultaneously. When this twin-electrode arrangement failed to overcome the progressive deterioration, it was thought by Moscicki, as stated hereinbefore, that such cathodic action could be prevented by charging or biasing the electrolyte negatively with respect to the filmed electrode. This is equivalent merely to displacing the axis about which the voltage of the power line is

2 oscillating with respect to the electrolyte from a zero potential to a substantial negative potential. It was overlooked, however, that the direct current potential of a filmed electrode relative to the electrolyte is not the only factor in the deterioration of the electrode film when an oscillating potential is superposed over direct current potential.

In such a case, regardless of voltage axis displacement produced by the aforesaid bias, and in accordance with the phase of the applied line voltage, one or the other of the filmed electrodes will be affected by the same deteriorating physicochemical processes as would be the case if it were operated as a cathode on a unidirectional voltage: more specifically, in the interval of a cycle in which the filmed electrode potential drops from peak + to peak —, the external face of the dielectric film loses negative charges conveyed by anions and acquires positive charges conveyed by cations. It is to be noted that this is exactly the condition under which the film of the active electrode of an aluminum rectifier loses its dielectric property, breaks down and permits the current to pass.

I have found that it is the impact of cations on the dielectric of an electrolytic condenser which is to be regarded as the primary cause of the dielectric deterioration. Indeed, the deterioration of such filmed electrodes can hardly be accounted for by the loss of anions held at the outer face by the electric field across the dielectric; and the present invention is concerned with a method of and a means for preventing such cation impact.

The invention, therefore, has for an object to reduce adequately, within the aforesaid indicated interval of the cycle, cation impact upon the dielectric of a condenser electrode and the consequent deterioration thereof.

A further object of the invention is to modify significantly the concentration of free anions in the electrolyte about a filmed electrode and thereby reduce the effective number of the trouble-making cations reaching the dielectric thereof.

A still further object of the invention is to provide simultaneously with a cycle interval of the applied voltage, a cloud of anions maintaining a substantial space charge as a potential barrier across substantially the path of the condenser current thereby to neutralize by recombination the free cations which would otherwise assist in conveying the condenser current to a filmed electrode.

Another object of the invention is to provide a novel potential barrier-producing member upon which, on the one hand, an adequate potential may be impressed and which, on the other hand, will not substantially intercept the flow of alternating current in the electrolyte between a filmed electrode and a non-filmed electrode of a condenser.

Still another object of the invention is to provide a condenser affording four times the capacity per unit area over the heretofore best known but unsuccessful electrolytic alternating current condensers.

The invention has for an object, also, to provide a symmetrical circuit for the operation of the novel condenser to reduce one of the sources of harmonics in the system.

In carrying out the invention, a condenser of either the single or the twin filmed electrode construction with associated non-filmed electrode or electrodes is arranged for connection in the usual manner across an alternating current power line where, for example, correction of power factor is desired. With the application of the alternating current to such a condenser, the present invention contemplates the establishment, across substantially the total area of the cross-section of the full current flow, of a potential negative relatively to that which would result thereat solely from the application of the phase of voltage at the condenser terminals. This creates a potential barrier opposing the electrolytic deposition of cations on the outer surface of the dielectric film of an electrode.

The nature of the invention will best be understood when described in connection with the accompanying drawings, in which:

Fig. 1 is a diagrammatic representation of the novel electrolytic condenser operation with accompanying graph of the potential relationships.

Fig. 2 is a graph of the voltage of the operating potential and shows that part of the cycle during which cation admission may occur with respect to a filmed electrode thereof.

Fig. 3 is a longitudinal section illustrating one embodiment of the invention and the manner of connecting the same to a power circuit.

Fig. 4 is a similar view illustrating a modification in the arrangement of the grid utilized in the novel condenser.

Figs. 5 and 6 are respectively an elevation (with power connection) and a transverse section taken on the line 6—6, Fig. 5, illustrating a further grid arrangement.

Fig. 12 is a front elevation, partly in longitudinal section, illustrating a condenser having a modified form of the grid.

Fig. 13 is a fragmentary plan thereof on an enlarged scale; and Fig. 14 is a transverse section taken on the line 14—14, Fig. 12, and on an enlarged scale.

Fig. 15 is a fragmentary transverse section, on a greatly exaggerated and disproportionate scale, through a different association of the electrodes, grid and electrolyte resulting in a roll-type of condenser; and Fig. 16 is a similar view of a simplified embodiment of the same.

Fig. 17 is a perspective view of the condenser roll.

Fig. 18 is a vertical section, partly in elevation, of the roll encased in a suitable housing member for the same.

Figure 7:
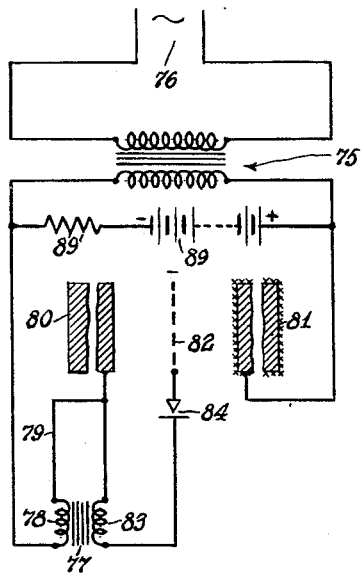
Fig. 7 is a wiring diagram illustrating the biasing of the condenser grid through a transformer.

Referring to the drawings, more particularly Figs. 1 and 2 thereof, a condenser is diagrammatically indicated by the filmed electrode 20 as of aluminum, and the non-filmed electrode 21, both immersed in an electrolyte 22, said electrodes being connected across a source of power indicated at 23, as is well understood. Since it is the impact of cations 24 on the dielectric 25 of the filmed electrode which is to be regarded as the primary cause for the deterioration of said dielectric, provision is made for preventing, so far as possible, such cation impact.

Accordingly, there is provided in the electrolyte a negtaive space charge resulting in a potential barrier, in the nature of a cloud of anions 26 across substantially the effective cross-section of the electrolyte or total area of the cross-section of full condenser flow, said potential barrier opposing itself to the flow of negative charges from the electrode 20 during that part of the cycle in which the dielectric film's outer surface would discharge anions and attract cations in absence of the cloud. This is the case during that portion 30 of the phase in which the potential of the filmed electrode 20 decreases from its positive to its negative peak. During the other half 31 of the phase, no such control is demanded since during this interval anions are deposited on the face of the dielectric and cations repelled therefrom and this is exactly the condition under which a dielectric film forms and improves.

Anions and cations are present in equal numbers, and in a quantity governed by the dissociation to a degree determined by the incidental concentration of the solute in the electrolyte. Their number cannot be altered. It is true that the equilibrium will be disturbed by an electrolytic current, but this will not significantly reduce the cation concentration so as to be a decisive influence upon the film deterioration.

I have found a method of and a means for providing a potential barrier controllable to an extent sufficient to prevent the landing of the cations 24 upon the dielectric film 25 in the electrolytic condenser.

In this connection, one more condition is to be understood. The film of the condenser electrode is, as aforesaid, of so small a thickness that it may be considered negligible when compared with the distances between the electrodes. Hence, a charge distributed throughout the surrounding electrolyte will result in a change of potential difference between the metal of the filmed electrode and the outer surface of its dielectric by only an amount of an order of magnitude smaller than the peak operating oscillating voltage.

When the phase of the applied voltage is at its positive peak at the filmed electrode 20 and a perforated electrode 35 is inserted between the electrodes 20 and 21, the distribution of potential between the electrodes 20 and 21 will be as shown by the curve a so long as no potential is impressed upon the electrode 35. However, when a negative potential is impressed on said electrode 35, the potential distribution then would not be such as is indicated in the curve b but, by virtue of the interaction of the entire system, would appear as the curve c. The latter distribution of potential will be caused by the condenser current flowing between the electrodes 20 and 21; and, by proper construction of the intermediate electrode 35, this current will be compelled to pass through the openings of said electrode without being intercepted by the metal thereof.

When the applied condenser voltage decreases by a small decrement in the course of the cycle, one elemental negative charge will as a consequence disengage itself from the film and the anion 25' carrying it will move toward the negative electrode 21, seemingly against the field. Hence, it will not get to the latter electrode but will remain somewhere in between it and the filmed electrode. Each time this occurs, another free anion will appear in the space and thus there will accumulate a cloud of anions generating a negative space charge between the electrodes.

This will continue until the space charge becomes sufficient for the mutual repulsion of the negative charges to overcome the opposing potential of the grid and in effect these charges will pass through the grid openings. It is to be understood that by impressing the aforesaid negative potential upon the grid element 35, there is created a current between the non-filmed electrode 21 and the grid element due to the conductivity of the electrolyte.

The space charge produced by free anions will increase as said decrement at the film becomes larger with decreasing phase potential until it becomes large enough to force anions over the negative potential of grid 35 unless, before that happens, the enhanced recombination process of incoming free cations with the anions will take charge of the convection of the condenser current. In each case individual cations will be prevented from reaching the face of the dielectric by said recombination process.

The electrode or grid element 35 must be so constructed that the condenser current will not be intercepted thereby between the filmed electrode and the non-filmed electrode, but rather be compelled to pass through the interstices of the said grid element. This may be accomplished in two different ways.

First, the metal of which the grid electrode is constituted may be of such a nature that its polarization potential drop in the particular electrolyte will be sufficient to set up an obstacle to the condenser current so that this current will not be substantially intercepted by the metal but will flow rather through the interstices than to pass into and out of the metal. If so, the electrolytic condenser current from one of the electrodes, such as the electrode 21, will not flow to one face of the metal of electrode 35, and will not be carried by electronic conduction within the metal to the opposite face to continue as electrolytic condenser current from the opposite face thereof to the filmed electrode 20, or vice versa, which would render the electrode 35 ineffective for its intended purpose. Such undesirable "mixed conduction" of current will not occur so long as the total cross-sectional area of the openings in the electrode 35 is sufficiently large to afford a potential gradient thereat low enough to remain below the polarization potential drop which would have to be overcome at the metal of electrode 35.

Secondly, the grid electrode may be so designed, by the use of insulating material, that the condenser current, if considered as flowing from the non-filmed electrode to the filmed electrode of the condenser, will be geometrically forced to pass through interstices prior to reaching the metal surface of the grid element, in which case the aforesaid mixed conduction at the grid metal will not occur significantly, regardless of polarization.

If the grid electrode were to intercept substantially condenser current, it would in effect become merely the non-filmed electrode of a condenser of the conventional type, and the aforesaid non-filmed electrode as well as the portion of the electrolyte surrounding the grid electrode could be regarded as superfluous. In other words, the function of the grid electrode in providing a potential barrier for the purpose set forth would be lost.

A design of the grid electrode of the first kind is shown in a practical embodiment, for example, in Fig. 3; and of the second kind, in Figs. 12 to 14, inclusive.

As shown in Fig. 3, an electrically insulating envelope such as the glass cylinder 40, closed at one end, is designed to retain the filmed electrode 41, the non-filmed electrode 42, and the grid element 43, as well as a suitable electrolyte, for example, the standard electrolyte composed of an aqueous solution of boric acid and a borate (sodium borate or ammonium borate). The open end of the cylinder is adapted to be sealed by means of an insulating stopper or cover such as of rubber and is of the duplex sealing type. That is to say, its outer portion 44 seals the end of the envelope and its inner portion 45 seals one end of an insulation tube 46, which tube is carried then by the said stopper.

The stopper carries also the non-filmed electrode 42 which is disposed within the tube 46, and a lead 47 extends therefrom axially through the stopper. A lead 48, which is filmed, extends also through the stopper, while a further lead 49 extends therethrough from the grid element 43. The latter is in the nature of a perforated metal cap or grid fitted over the other end of the tube 46, the total cross-sectional area of the perforations 50 of the grid being such as to compel the electrolytic condenser current to pass therethrough in accordance with the requirements hereinbefore set forth.

In accordance with the invention, there is impressed upon the grid 43 a negative potential, for example, as derived from a battery 51, the negative terminal of which battery being connected thereto through a choke coil 52 and its positive terminal connected to the non-filmed electrode 42, as well as to one lead 53 of the power line. The other lead 54 of this line is connected directly to the filmed electrode 41 through its lead 48.

Thus, when power is applied to the condenser through the leads 53—54, distinctly separate circuits are established, to wit: one for alternating current between the electrodes 41 and 42 and another for direct current between the electrode 42, the grid element 43, the battery 51 and the choke coil 52, and the action as described in relation to Fig. 1 is effected.

Or, as shown in Figs. 4 to 6, the perforated grid element 55 may be of such a nature as to enclose substantially one of the condenser electrodes such as the non-filming electrode 56, Fig. 4, resulting not only in economy of space due to the concentric arrangement but also in a substantial reduction of the total resistance of the electrolyte thereby reducing the power loss in the condenser. To this end, the filmed electrode 57 is preferably a spirally coiled foil of a filming metal such as aluminum which may be perforated for more ready passage of current in the electrolyte. This electrode is connected by a lead 58 to one side of the source of alternating current supply 59, the other side being connected by a lead 60 to the non-filming electrode 56, as well as to the positive terminal of a biasing battery 61 and through a choke coil 62 to the grid 55. The electrolyte as well as the said electrodes and grid is contained within a cylindrical container 63 of insulating material or of metal. A removable cover 64 supports the said electrodes and grid.

The container, of course, may be constructed of metal, such as copper, Fig. 5, in which case it may constitute the non-filming electrode 65 of the condenser. The filmed electrode 66 in this instance is enclosed in the grid which is in the nature of a perforated basket 67 substantially surrounding said electrode 66. A top 68, which may be perforated or not, is removably attached to the basket for admitting the electrode 66 therein, said basket being connected to a lead 69. This lead connects with the negative side of a biasing battery 70, the positive side of which connects through a choke coil 71 to one side of the source of alternating current supply 72 and to the non-filming metal container electrode 65. The other lead of this source connects through the basket, being insulated therefrom, to the filmed electrode 66. Suitable spacer buttons 73 distributed about the interior of the container-electrode 65 serve to support and center the basket therein.

The foregoing embodiments contemplate electrolytic alternating current condensers in which the grid electrode is negatively biased from a direct current source of electrical energy such as a battery. However, it is feasible to carry out the novel method of operation of electrolytic condensers when applied to alternating voltage by effecting the bias of the grid from an alternating current source. It will be understood that in such case the voltage applied to the grid of the condenser has to be substantially in phase with the condenser current and therefore shifted approximately 90° against the line voltage.

Figure 8:
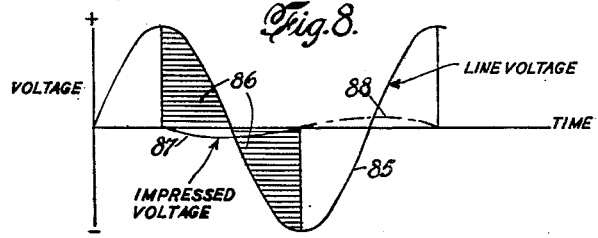
Fig. 8 is a graph illustrating the potential distributions involved.

For example, reference being had to Figs. 7 and 8 of the drawings, in addition to the transformer 75 being connected with the source of alternating voltage supply 76, there is provided a second, biasing transformer 77, the primary winding of which is inserted in the condenser circuit. To this end, one lead of the primary coil 78 of transformer 77 is connected to the secondary of transformer 75 and the other lead 79 is connected to the non-filmed electrode 80; and the filmed electrode 81 of the condenser is then to be connected to the other terminal of the secondary of transformer 75. Between these two electrodes is introduced the grid 82, the biasing voltage for this electrode being secured from the secondary 83 of transformer 77. This is effected by connecting one lead thereof to the non-filmed electrode 80 and the other lead preferably through a rectifier 84 to the said grid 82, inasmuch as it is essential to have a negative potential on the grid during half of the phase, while during the other half of the phase it is more or less immaterial but still advisable to interrupt the supply of potential to the grid.

This is illustrated more clearly in the graph, Fig. 8 of the drawings, in which the line voltage is represented by the sinusoid 85, the half period during which the electrode film is to be protected being indicated by the cross-hatched portions 86. The protecting impressed effective voltage of the grid is indicated by the portion 87 of the potential curve, the broken-line portion 88 of which indicates the part of the phase of the biasing voltage which may be disconnected by the rectifier.

If it is found desirable to insure beyond any question that the filmed electrode even at rest will not assume a negative potential with respect to the electrolyte and the other electrode, then a battery 89 may be inserted in series with a high resistance 89' across the secondary of transformer 75.

Figure 9:
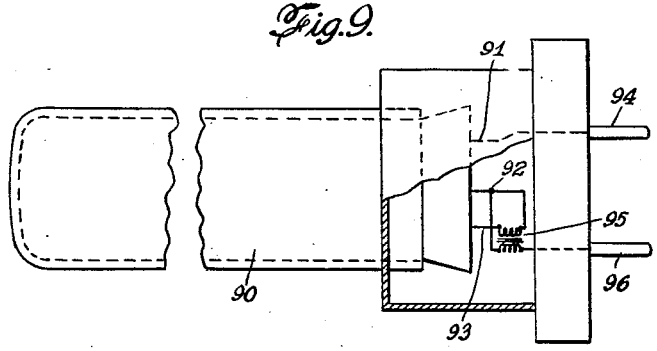
Fig. 9 is an elevation of an embodiment of the novel condenser, similar to that illustrated in Fig. 3 but wherein the biasing means are self-contained and the unit constructed in the nature of a pin terminal member for convenient introduction into a socket connected to a power circuit.

A practical embodiment of the biasing of the grid by means of a transformer is indicated in Fig. 9, in which a construction of condenser is illustrated similar to that described with reference to Fig. 3 of the drawings. As shown, the condenser envelope is indicated at 90 and the leads 91, 92, and 93 from respectively the filmed, non-filmed and perforated electrodes of the condenser are arranged in the present embodiment to be connected respectively to a connecting pin or prong 94; to one terminal of the secondary of a transformer 95; and to the other terminal of said secondary, while the primary of said transformer is included in circuit between the lead 92 and another connecting pin or prong 96. The transformer is thus connected across the grid and the non-filmed electrode of the condenser; and the prongs 94 and 96 are readily adapted to the usual socket connection for a power line the power factor of which is to be corrected.

Figure 10:
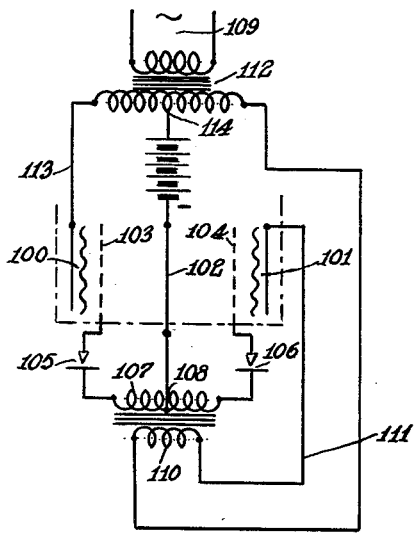
Fig. 10 illustrates the invention as embodied in a twin-anode type of electrolytic condenser.

The provision of a biasing electrode as hereinbefore set forth lends itself also to the operation on alternating voltage of electrolytic condensers of the conventional "twin anode" type, in which two filmed electrodes operate in series. In such embodiment, however, each filmed electrode is to be associated with its own particular grid and independent biasing transformer circuits are provided for the respective grids, each circuit in this instance requiring its own rectifier in order to obviate direct current flow between the two grids. Reference being had to Fig. 10, the two filmed electrodes are indicated at 100 and 101 as associated with a non-filmed electrode 102 common to both of the said electrodes. A biasing grid 103 and a similar grid 104 are associated respectively with the filmed electrodes 100 and 101 and have a terminal connected through respective rectifiers 105 and 106 to the secondary 107 of a transformer having its center tap 108 connecting to electrode 102. The primary 110 of this transformer is energized from a source of alternating voltage shifted approximately 90° against the line voltage of the main 109. In the present instance, this is indicated by introducing the said primary 110 into a lead 111 from the electrode 101 of the condenser, said primary being connected also to one terminal of the secondary of the power transformer 112, while the other terminal thereof connects through a lead 113 directly to the other filmed electrode 100. A center tap 114 from transformer 112 may be connected in the customary manner to the non-filmed electrode 102 and, if desirable, over a source of direct current potential.

Figure 11:
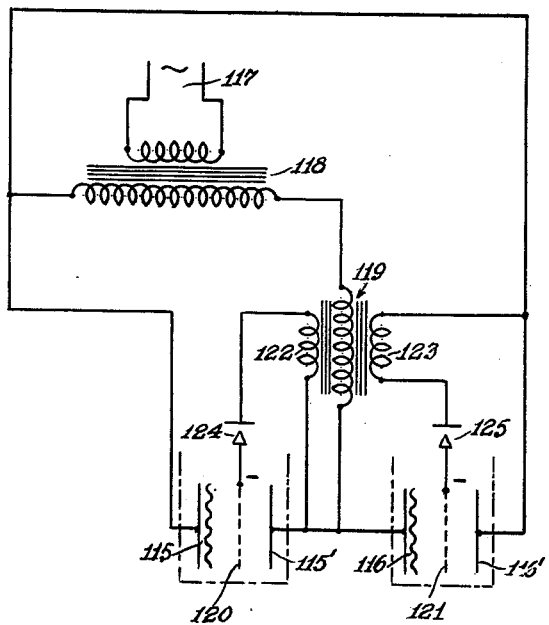
Fig. 11 is a view similar to Fig. 10 but illustrates a duplex arrangement of the anodes.

Operation of a condenser of the twin anode type under perfectly symmetrical conditions without placing the two filmed electrodes in series as set forth hereinbefore in connection with the arrangement shown in Fig. 10, may be effected as indicated in Fig. 11. In the arrangement therein illustrated, the two filmed electrodes 115 and 116 are connected in parallel (in a reverse sense) to the source of power indicated at 117 supplying the primary of a transformer 118. The required phase shift in this embodiment is again produced by placing the primary of an additional transformer 119 in the circuit of the condenser current. This condenser current flows from the secondary of transformer 118 to one pair of the condenser electrodes 115 and 115', and returns through the primary of transformer 119; and similarly through the other pair of electrodes 116 and 116' through said primary, completing the parallel operation and affording not only symmetrical operation but also quadrupling the capacity as compared with the arrangement described in connection with Fig. 10. Voltages impressed on the grids 120 and 121 are provided respectively from secondaries 122 and 123 through the corresponding rectifiers 124 and 125, the said secondaries 122 and 123 in this embodiment, however, not being directly metallically interconnected.

While the perforated electrode or grid-like member has hereinbefore been described and shown as a surrounding casing for the non-filming electrode and provided with perforations, it is to be understood that I do not wish to be restricted to perforations in a specific sense, since it is the purpose of the perforations or openings merely to afford a cross-sectional area ample to permit free flow of current in the electrolyte of an electrolytic condenser.

Furthermore, such electrode need not be constructed wholly of metal, but may be of the second kind, in which case its design comprises in part insulating material. For example, a condenser construction is illustrated in Figs. 12 to 14, inclusive, in which the grid comprises an open arrangement of circularly disposed tubular elements 130 of insulating material, such as rubber tubing, retained between a pair of circular disks 131 and 132 of insulation material representing the top and bottom of the grid member. The respective tubular elements 130 pass through and fit corresponding openings 133 and 134 of the top and bottom disks and receive stopper or closure elements 135 and 136, respectively, of insulation, which serve also to hold firmly a tube to the respective disks; the upper one of which serving as the top of the container 137 for the electrolyte 138 of the condenser as well as for supporting the filmed electrode 139. This electrode may be in the form of a spirally coiled foil of filmed aluminum surrounding within the electrolyte the said grid member. Each of the tubular elements 130 of this grid member is provided with an opening, preferably as a longitudinal slot 140, and the said elements are so positioned that the said openings preferably will face toward the said electrode 139. Within each tubular element is longitudinally retained a wire 141 secured at the bottom to the stopper 136 and passing at the top through the stopper 135 to provide for electrical interconnection of all of the said wires, the whole assembly then constituting the electrode upon which a negative potential is to be impressed as hereinbefore set forth.

The respective tubular members are to be so spaced as to be separated from one another in a manner such that the requisite cross-sectional area for free flow of current through the electrolyte will be secured as well as to afford a practically uniform distribution of the space charge. The non-filmed electrode 142 of the condenser is in this embodiment mounted in the top disk 131 to extend, preferably axially, within the grid member; and connections are to be made from its terminal 143 exteriorly of the grid member and the terminal 143' of the filmed electrode 139, and similarly from the terminal 144 of the assembly of wires 141, to the power line and biasing system as hereinbefore set forth.

The novel features of an electrolytic condenser, as hereinbefore set forth, may be embodied also in a condenser of the roll-up type which is frequently used with a highly viscous electrolyte separating the electrodes and so-called "dry" type of condenser. Thus, reference being had to Figs. 15 to 18, inclusive, the condenser is indicated as comprising spaced metal foil electrodes 145 and 146, the former constituting the filmed electrode and the latter the non-filmed metal electrode, the former electrode having in this particular embodiment a bilaminate coating 147, of the nature set forth in my prior U. S. Letters Patent No. 2,076,904, for protection of the film 148 of said electrode 145, since the various elements are to be wound or rolled up in the manner disclosed in my prior U. S. Letters Patent No. 2,076,905. The general arrangement is similar to that disclosed in said Patent No. 2,076,905 save for the interpositioning of a grid element 149 to be provided with a negative potential as hereinbefore set forth. This grid element is faced on its opposite sides with retiform insulating material 150, such as cambric, permeated by a viscous electrolyte, for example such as a condensation product of an alcohol and an acid, as that set forth in my prior U. S. Letters Patent No. 2,013,564.

The condenser may, of course, be constructed without the protective coating 147, as is indicated in Fig. 16 wherein the grid 151 is shown as located between the insulating fabric layers 152 bearing the viscous electrolyte and the said layers 152 then being in direct contact with the film 153 of the filmed electrode 154 and with the non-filmed electrode 155.

In either form the separated electrode and grid foils are rolled or coiled in well-known manner to form a roll 156, Fig. 17 of the drawings; and, if desired, such roll may be housed within a suitable casing 157, leads 158, 159 and 160 being brought from the respective elements to corresponding terminals 161, 162 and 163 provided on the cover of the casing.

I claim:

1. The method of operating an electrolytic condenser having a filmed and a non-filmed electrode, which includes applying an oscillating voltage to said electrodes establishing in the electrolyte during a predeterminedly controllable interval within the cycle of the oscillating voltage, intermediate the condenser electrodes and across substantially the total area of the cross-section of the condenser current flow, a potential negative relative to that produced at said area by the said flow by applying an auxiliary voltage to said area of the electrolyte acting to cause a controlled current flow.

2. The method of operating an electrolytic condenser on oscillating voltage according to claim 1, wherein the negative potential is established solely in the interval during which the oscillating voltage applied to the filmed electrode decreases.

3. The method of operating an electrolytic condenser having a filmed and a non-filmed electrode, which includes applying an oscillating voltage to said electrodes changing free ion concentration within the electrolyte enveloping the filmed electrode to set up during a predeterminedly controllable interval within the cycle of the said oscillating voltage a potential barrier across the path of the condenser current flow thereby produced by maintaining, during said interval, upon substantially the total area of the cross-section of the electrolyte intermediate the filmed electrode and the non-filmed electrode of the condenser, a potential below that which would result solely from the phase of the applied voltage by applying an auxiliary voltage to said area of the electrolyte and acting to cause a controllable current flow.

4. The method of operating an electrolytic condenser of the twin-filmed electrode, series-connected type on oscillating voltage according to claim 3, which comprises changing the free ion concentration in the portions of the electrolyte surrounding the respective filmed electrodes to provide potential barriers between the respective filmed electrodes and the non-filmed electrode of the condenser.

5. The method of operating an electrolytic condenser on oscillating voltage according to claim 4, wherein the potential barriers are provided alternatively between the respective filmed electrodes and the non-filmed electrode of the condenser.

6. An electrolytic condenser for operation on oscillating votlage, comprising a filmed electrode, a non-filmed electrode, and a contiguous electrolyte for both electrodes, said electrodes having terminals adapted for connection across a source of oscillating voltage; a further non-filmed electrode interposed within the electrolyte across substantially the total area of the cross-section of the current flow between the said filmed and unfilmed electrodes and having an open area for the passage of electrolytic current; and predeterminedly controllable means for impressing upon the interposed electrode an auxiliary voltage such as to produce throughout said area a potential negative with respect to the potential which would result solely from the application of the oscillating voltage to the condenser terminals.

7. An electrolytic condenser for operation on oscillating voltage according to claim 6, wherein the interposed electrode is a perforated metal plate.

8. An electrolytic condenser for operation on oscillating voltage according to claim 7, wherein the combined area of the perforations is such that the voltage drop therethrough between opposite faces of the plate is less than the sum of the polarization voltages which would prevail at said opposite faces in the absence of said perforations.

9. An electrolytic condenser for operation on oscillating voltage according to claim 6, wherein the interposed electrode is a perforated plate which completely surrounds the filmed electrode of the condenser.

10. An electrolytic condenser for operation on an oscillating voltage according to claim 6 wherein the first-named non-filmed electrode is in the form of a plate having perforations for passing the condener current, the combined area of the perforations being such that the voltage drop therethrough between opposite faces of the electrode is less than the sum of the polarization voltages which would prevail at said opposite faces in the absence of said perforations.

11. An electrolytic condenser for operation on oscillating voltage according to claim 6, wherein a sealed envelope is provided to encase the said electrodes and the electrolyte and the interposed electrode, the latter being located intermediate the said electrodes and dividing the envelope into two compartments.

12. An electrolytic condenser for operation on oscillating voltage, comprising two non-filmed electrodes, one being perforated, a filmed electrode associated therewith, leads from the respective electrodes, the leads from the non-perforated, non-filmed electrode and the filmed electrode being adapted for connection to a source of oscillating voltage, and means for impressing a negative potential upon the perforated electrode.

13. An electrolytic condenser for operation on oscillating voltage according to claim 12, wherein a source of direct current potential is connected across the condenser terminals, and a resistor is connected in series therewith.

14. An electrolytic condenser for operation on oscillating voltage according to claim 12, wherein a choke coil is connected in series with the means for impressing a negative potential.

15. An electrolytic condenser for operation on oscillating voltage comprising two non-filmed electrodes, one of which is perforated, and a filmed electrode associated therewith, all enclosed in a tube closed at one end, an insulation stopper member engaging said tube at the opposite end to seal the tube thereat, and an open-ended cylinder within said tube, said stopper member engaging its one end to support the open-ended cylinder, the opposite end of which cylinder is closed by said perforated electrode, and the other non-filmed electrode is located within said open-ended cylinder and is supported by said stopper member through its lead passing therethrough, the remaining leads also passing through said stopper member, and means for impressing a negative potential upon said perforated electrode.

16. An electrolytic condenser for operation on oscillating voltage according to claim 15, wherein a casing is mounted over the stopper member end of the tube and is provided with a base portion having a pair of connection prongs extending outwardly therefrom, one being connected to the lead from the filmed electrode, and a transformer is provided within the casing having its primary winding connected in series with the other prong and the unperforated non-filmed electrode, and its secondary winding in series with the last-named electrode and the perforated electrode to afford the source of negative potential.

17. An electrolytic condenser comprising, a pair of filmed electrodes connected in series and located in an electrolyte, together with a non-filmed electrode common thereto and means to maintain the pair of electrodes positive with respect to said common electrode, a pair of further non-filmed electrodes associated with the respective filmed electrodes and having an open area for the passage of electrolytic current, and a source of direct current potential connected to the further non-filmed electrodes to impress respectively a negative potential thereon.

18. An electrolytic condenser constructed according to claim 17, wherein the source of impressed potential is a transformer and the oscillating potential therefrom is connected through respective rectifiers to the further non-filmed electrodes.

19. An electrolytic condenser for operation on oscillating voltage according to claim 6, wherein the interposed electrode comprises supporting disk members of electrical insulation material; tubular elements of electrical insulation material mounted between the disk members and having each a longitudinal slot facing substantially one of the condenser electrodes; and electrical conductors of non-filming metal extending axially through the respective tubular elements beyond a disk member are juxtaposed to the corresponding slots therein and are electrically interconnected in parallel.

20. An electrolytic condenser for operation on oscillating voltage according to claim 6, wherein the interposed electrode comprises a pair of circular disk members provided with circularly disposed openings, the openings of one disk being located coaxially with those of the other; rubber tubes are provided between said disks and extend through the respective openings thereof, each tube having a longitudinal slot facing substantially one of the condenser electrodes; plugs are provided to fit the pairs of protruding portions of the respective tubes to retain the same to the corresponding disks; and wires of non-filming metal pass through the respective plugs of one of the disks to extend axially within the corresponding tubes, said wires being electrically interconnected in parallel exteriorly of said tubes.

21. An electrolytic condenser for operation on oscillating voltage according to claim 6, wherein the interposed electrode comprises a pair of circular disk members, provided with circularly disposed openings, the respective openings in one disk being axially alined with the other corresponding openings in the other disk, insulating tubes between said disks extending through the respective alined openings thereof, said tubes having longitudinal slots respectively facing one of the condenser electrodes, means for retaining said tubes in said disk, and conductors extending into said tubes through one of said disks and exteriorly connected in parallel, said one disk being provided with a further opening and a conductor passing therethrough from a non-filmed electrode which is located between the disks and is carried from said one disk.

22. A potential barrier-producing member for use in the operation of electrolytic condensers on oscillating voltage, as set forth in claim 6, comprising a grid structure adapted for insertion within the condenser electrolyte in the path of current flow between the condenser electrodes in lieu of the second non-filmed electrode, said structure having an open area for electrolytic current with metal portion to receive a negative potential.

23. A grid structure for use as a potential barrier-producing member intermediate the condenser electrodes and having metal portions to receive a negative potential according to claim 6, wherein an open area in the metal provides for electrolytic current, and insulation material is interposed between metal portions to define the open area.

24. For use in an electrolytic condenser as described in claim 6: a grid element with lead adapted for connection to a source of potential, said grid element comprising non-filming metal with interstices adapted to pass freely the condenser current.

25. A grid element for condenser use according to claim 6, wherein the metal is non-filming and is provided with interstices adapted to pass the condenser current freely, and has a polarization voltage in an electrolyte sufficient to divert the condenser current through the interstices.

JULIUS EDGAR LILIENFELD.

REFERENCES CITED

The following references are of record in the file of this patent:

UNITED STATES PATENTS

| Number | Name | Date |
|---|---|---|
| 926,128 | Moscicki | June 29, 1909 |
| 1,497,430 | Chubb | June 10, 1925 |
| 1,567,791 | Duhme | Dec. 29, 1925 |
| 1,745,175 | Lilienfeld | Jan. 28, 1930 |
| 1,753,912 | Woodhull | Apr. 8, 1930 |
| 1,999,408 | Edelman | Apr. 30, 1935 |

FOREIGN PATENTS

| Number | Country | Date |
|---|---|---|
| 342,643 | Great Britain | Feb. 5, 1931 |
| 496,113 | Great Britain | Nov. 23, 1938 |